United States Patent Office.

IMPROVED COMPOSITION FOR MAKING SHARPENING-STONES.

ROBERT R. MILLER AND A. W. CARVER, OF PHILADELPHIA, PENNSYLVANIA, ASSIGNORS TO B. HOOPES AND C. BORIE, OF THE SAME PLACE.

Letters Patent No. 60,536, dated December 18, 1866; antedated December 5, 1866.

---

The Schedule referred to in these Letters Patent and making part of the same.

TO ALL WHOM IT MAY CONCERN:

Be it known that we, ROBERT R. MILLER and A. W. CARVER, of Philadelphia, Pennsylvania, have invented an Improved Composition for making Sharpening-Stones; and we do hereby declare the following to be a full, clear, and exact description of the same.

Four ounces of gum shellac are dissolved in half a pint of alcohol, and to two ounces of the solution thus obtained is added one pint of a solution made by dissolving twelve ounces of frosted glue in one quart of water. To the above mixture is added emory, sand, or other suitable substance, in such quantities as to form a pasty mass, which is then spread on a strip of wood or other material. After standing for four or five days, the composition will be so hard that it can be used as a substitute for the ordinary stones employed for sharpening knives, scythes, and other similar tools. It will be apparent that this composition may be applied to articles or surfaces of any desired form.

Without confining ourselves to the exact proportion of the ingredients herein described, or to the precise mode of combining the same, we claim as our invention, and desire to secure by Letters Patent—

A composition for making sharpening-stones, consisting of the materials herein described, combined substantially as specified.

In testimony whereof we have signed our names to this specification in the presence of two subscribing witnesses.
R. R. MILLER,
ALBERT W. CARVER.

Witnesses:
CHARLES COMLY, Jr.,
J. B. COMLY.